(12) United States Patent
Shimotomai et al.

(10) Patent No.: US 8,558,536 B2
(45) Date of Patent: Oct. 15, 2013

(54) SOLAR SIMULATOR AND A MEASURING METHOD OF A MULTI-JUNCTION PHOTOVOLTAIC DEVICES

(75) Inventors: Mitsuhiro Shimotomai, Okazaki (JP);
Yoshihiro Shinohara, Okazaki (JP)

(73) Assignee: Nisshinbo Holdings Inc., Tokyo (JP)

( * ) Notice: Subject to any disclaimer, the term of this patent is extended or adjusted under 35 U.S.C. 154(b) by 332 days.

(21) Appl. No.: 13/054,744

(22) PCT Filed: Jul. 2, 2009

(86) PCT No.: PCT/JP2009/062491
§ 371 (c)(1),
(2), (4) Date: Jan. 18, 2011

(87) PCT Pub. No.: WO2010/007927
PCT Pub. Date: Jan. 21, 2010

(65) Prior Publication Data
US 2011/0127992 A1      Jun. 2, 2011

(30) Foreign Application Priority Data
Jul. 18, 2008   (JP) .................................. 2008-186780

(51) Int. Cl.
*G01R 31/00* (2006.01)
(52) U.S. Cl.
USPC ........................................... 324/96; 362/231
(58) Field of Classification Search
None
See application file for complete search history.

(56) References Cited

U.S. PATENT DOCUMENTS

| | | | | |
|---|---|---|---|---|
| 4,641,227 A | * | 2/1987 | Kusuhara | 362/231 |
| 2002/0044774 A1 | * | 4/2002 | Kawasaki et al. | 396/155 |
| 2006/0290344 A1 | * | 12/2006 | Shimotomai et al. | 324/158.1 |
| 2008/0298043 A1 | * | 12/2008 | Shimotomai et al. | 362/1 |
| 2009/0080174 A1 | * | 3/2009 | Shimotomai et al. | 362/1 |

FOREIGN PATENT DOCUMENTS

| | | | |
|---|---|---|---|
| JP | 2886215 | | 4/1999 |
| JP | 2002-048704 | * | 2/2002 |
| JP | 2003-007633 | | 1/2003 |
| JP | 2003-031825 | | 1/2003 |
| JP | 3500352 | | 2/2004 |
| JP | 2006-147755 | | 6/2006 |
| JP | 2007-088419 | | 4/2007 |

* cited by examiner

*Primary Examiner* — Minh N Tang
*Assistant Examiner* — Stephen G Armstrong
(74) *Attorney, Agent, or Firm* — J.C. Patents (57) ABSTRACT

A solar simulator and a measurement method of the multi-junction photovoltaic device is provided. The measurement method includes following processes. The process that the halogen lamp emits a flash and a top of a light pulse wave shape is controlled to be flat. The process that the xenon lamp once or plural times emits a flash which has the flat top and is shorter pulse than the flat area of the halogen lamp flash while the top of a light pulse shape of the halogen lamp flash is flat. The process that the flashes from the halogen lamp and the xenon lamp is irradiated to the photovoltaic device as the measurement object, and during the emission of the flash from the xenon lamp, the load of the photovoltaic device is controlled and the current and the voltage generating therefrom are measured at single point or plural points.

14 Claims, 7 Drawing Sheets

SOLAR SIMULATOR AND A MEASURING METHOD OF A MULTI-JUNCTION PHOTOVOLTAIC DEVICES

CLAIM FOR PRIORITY

The present application is a continuation of PCT/JP2009/062491, filed on Jul. 2, 2009, and is related to and claims priority from Japanese patent application no. 2008-186780 (filed on Jul. 18, 2008). The entire contents of the aforementioned application is hereby incorporated by reference herein.

BACKGROUND OF THE INVENTION

1. Field of the Invention

The present invention relates to a solar simulator to measure current and voltage characteristics of a multi-junction photovoltaic device with high speed and precision, and a measuring method.

2. Description of the Background Art

An incident photon-to-current conversion efficiency of a photoelectric conversion element such as a photovoltaic device, a photovoltaic power element and an optical sensor is measured by measuring an electric current and voltage characteristics of the element under light irradiation. In case of characteristic measurement of a photovoltaic device, output characteristic curve is obtained by plotting collected data on the graph set up with voltage as horizontal axis and current as vertical axis. This curve is called an I-V curve generally.

As a measuring method, a method using sunlight as irradiating light or a method using an artificial light source as irradiating light is available. In the method using an artificial light source, a method using a fixed light source and a method using a flash source are known as patent documents 1 and 2.

By the method using a fixed light, tens of minutes are often necessary to make irradiance stable after putting the lighting on. The light source is needed to turn on continuously in order to keep the irradiance stable, but the temperature of the housing that holds the light source rise seriously. And since a part in the housing is always exposed to a light, various problems will occur, such of a degradation of an optical component as a mirror or an optical filter.

So, without using a fixed light, a method to measure an electric current and voltage characteristics of large area photovoltaic device by generating a flash has been proposed. A xenon lamp is used for a pseudo solar light source that generates a flash. And there are a single flash measuring method which uses one flash having a relatively long light-emitting time, and a short pulse flash measuring method which uses multiple flashes having a short light-emitting time.

However, by the single flash method, it is necessary to make long pulse over 100 msec to obtain I-V characteristic curve by sweeping a load of a photovoltaic device with a light emission. To emit such long pulse light, an interval between an emission and next emission needs to take a long time, so the measuring time will get longer. And, by emitting a long pulse light, a stress to the lamp will be large, so a lifetime of the lamp will be shortened.

By the method emitting multiple short pulse flash, a stress to the lamp is small because of the flashing, so emission can be performed with short interval. And as the emitting time is short, circumstances of an inside of the lamp such as temperature are hard to change, so peak irradiance tends to be stable. And because the pulse of the light which a photovoltaic device as a measurement object receives is short, the temperature of the measurement object will be hard to rise.

However, a wave shape of the short pulse flash is similar as mountain of which skirts are about 1 msec wide and the mountain don't has any flat area at a summit area. Thus, by once flashing, only one set of data as irradiance, a current and voltage can be collected. And, in measurement of slow response photovoltaic device, an output power may be measured as having low power because the output response cannot track fully the irradiance wave. 20 to 40 seconds are needed for a measurement, because the 60 to 120 times of flashing are needed.

Thus, in patent document 3, the following method is proposed to obtain an I-V curve. In the method, a flash having a flat top at the pulse wave is emitted toward a photovoltaic device by controlling a load thereto.

By the way, the spectrum of sunlight is extending from the ultraviolet rays to the infrared rays, and a single-junction photovoltaic device that has only one p-n junction cannot use lights over all wavelengths for power generation. Thus, a multi-junction photovoltaic device that connects plural p-n junctions in series is known. It generates electric power over wide wavelength with the multi-junction, so it can improve power generation efficiency.

In a multi-junction photovoltaic device, an upper layer or a top layer and a lower layer or a bottom layer are connected electrically in series. A top layer and a bottom layer have a different spectral sensitivity. A top layer has high sensitivity at short wavelength, and a bottom layer has high sensitivity at long wavelength. An electric charge of a bottom layer will increase in case that a spectrum shifts to long wavelengths, but an amount of power generation is restricted to the amount of power generation of a top layer because of the series connection. In this way, a multi-junction photovoltaic device has characteristics as power generation changes with a spectrum.

In the multi-junction photovoltaic device, an inspection using only one light source of xenon lamp as described in the patent documents 1, 2 and 3 has following problems. A spectrum of a xenon lamp has a lot of strong bright lines at long-wavelength side. The bright lines are attenuated by an optical filter, and used. But there are extremely strong bright lines near 820 nm and 900 nm, and those lines are difficult to be removed by an optical filter. In case that a bottom layer has spectral sensitivity near a range from 800 nm to 900 nm, output characteristics will change by the bright line. The characteristics of the optical filters has an unevenness which originates in production lots. Thus, an intensity of the bright line is different with respect to each inspecting apparatus. In case that a bottom layer of a multi-junction photovoltaic device has a spectral sensitivity at the aforementioned wavelength range, a measured value is different with respect to each inspecting apparatus.

In patent document 4, a solar simulator that has two light sources as a halogen lamp and a xenon lamp is proposed to solve the problem. Lights from a halogen lamp and a xenon lamp penetrate each optical filter and a xenon lamp will emit short wavelength light and a halogen lamp will emit long wavelength light, so an output characteristics of a multi-junction photovoltaic device is measured with a lowered effect from the bright line.

It is also available to change a balance of a long wavelength spectrum and a short wavelength spectrum by changing a power of the each light source. Thus, it is available to obtain power characteristics of which spectrum balance is adjusted finely.

Patent document 1: Japanese Patent No. 2886215
Patent document 2: Laid-open Japanese Patent Application No. 2003-31825

Patent document 3: Laid-open Japanese Patent Application No. 2007-88419

Patent document 4: Japanese Patent No. 3500352

SUMMARY OF INVENTION

However, in the prior arts, a halogen lamp emits to make a top of a light wave shape to be flat within a few seconds, and a xenon lamp simultaneously emits a short pulse tens of times. So an optical filter is heated by long time emission of a halogen lamp, and a halogen lamp and a xenon lamp must take a pause of five to ten-odds seconds, for a next emission after an emission. This kind of cycle must be repeated 4 to 5 times. Thus, it takes 60 to 120 seconds to measure output characteristics only.

A halogen lamp don't emit immediately for a command of emission, so it has unevenness of emitting time. So, increasing frequency of a halogen lamp emission number of times will generate a variability of a timing of emission and waste measurement times.

So until now, an usage of a two-light-source solar simulator of a multi-junction photovoltaic device which uses a halogen lamp and a xenon lamp have been limited only for a research and development.

To solve the aforementioned problems, the present invention provides a solar simulator that measures characteristics of multi-junction photovoltaic device for a short time, and a measuring method of a multi-junction photovoltaic device using the simulator.

To solve the aforementioned problems, a solar simulator of the present invention is characterized as comprising: a first light source; a second light source of which wavelength band is different from the wavelength band of the first light source; a first irradiance detector which measures an intensity of a flash from the first light source; a first waveform control device which controls so as to make a top of a light pulse shape of the first light source to be flat by measurement of the first irradiance detector; a second irradiance detector which measures an intensity of a flash from the second light source; a second waveform control device which controls so as to make a top of a light pulse shape of the second light source to be flat by measurement of the second irradiance detector; a load circuit which applies a load to a photovoltaic device as a measurement object; and a total control device which controls the first light source, the second light source, the first waveform control device, the second waveform control device and the load circuit;
wherein the total control device once or plural times makes the second light source emit a flash of which light pulse shape is flat and is shorter pulse than the flash of the first light source while a top of a light pulse shape of the first light source is flat.

The present invention can employ the following configuration: the total control device performs so as to emit a combined light of the first light source and the second light source plural times;

The present invention can employ the following configuration: the solar simulator further includes a first optical filter which a predetermined wavelength light of the flash from the first light source penetrates so as to be irradiated to a photovoltaic device as a measurement object and a second optical filter which a predetermined wavelength light of the flash from the second light source penetrates so as to be irradiated to a photovoltaic device as a measurement object.

The present invention can employ the following configurations: the total control device sweeps the load of the photovoltaic device by the load circuit; the second waveform control device has a FF control unit, which performs feedforward control to make a top of a light pulse shape of the second light source to be flat; the second waveform control device has FB control unit which performs feed back control.

To solve the aforementioned problems, a measurement method of a multi-junction photovoltaic device of the present invention is characterized as comprising: a process that a first light source emits a flash and an irradiance detector measures an intensity of the light and a top of a light pulse shape of the first light source is controlled so as to be flat; a process that a second light source once or plural times emits a flash which has flat top and is shorter pulse than a flat area of the flash from the first light source, while a top of a light pulse shape of the first light source is flat; and a process that the flashes from the first light source and the second light source are irradiated to a photovoltaic device as a measurement object, and during the emission of the flash from the second light source, the load of the photovoltaic device is controlled, and a current and a voltage generating from the photovoltaic device are measured at a single point or more points The present invention can employ the following configuration: the first light source emits a flash plural times while the second light source only emits the flash once.

The present invention can employ the following configuration: the measurement method further includes a process that the predetermined wavelength lights of the flash from the first light source penetrate a first optical filter and a process that the predetermined wavelength lights of the flash from the second light source penetrate a second optical filter.

The present invention can employ the following configuration: the process to measure a current and voltage generating from the photovoltaic device at a single point or plural points by controlling the load of the photovoltaic device is the process to measure the current and the voltage generating from the photovoltaic device at plural points by sweeping the load of the photovoltaic device.

The present invention can employ the following configuration: the measurement method further includes a preliminary measurement process that the first light source and the second light source irradiate flashes to the photovoltaic device before the measurement process, and the approximate value of characteristic value of the photovoltaic device is obtained by controlling the load.

The present invention can employ the following configurations: the first light source emits the flash once, and the second light source plural times emits the flashes which has flat top and is shorter pulse than the flat area of the flash from the first light source while the top of the light pulse shape of the first light source is flat; performing feedforward control to make a top of a light pulse shape of the second light source to be flat; performing feedback control furthermore to make a top of a light pulse shape of the second light source to be flat.

A solar simulator of the present invention measures a multi-junction photovoltaic device as following. A flash which has a relatively long pulse shape with a flat top is emitted from a first light source, and an another flash is emitted from a second light source to overlap with a top flat area of the flash from the first light source, and the light from the second light source is shorter flash than a flat area of the flash of the first light source. The flash from the second light source is also flat at a top area. While long wavelength flash and short wavelength flashes are emitted simultaneously, an intensity of overlapped flash stays constant. Under these circumstances, characteristics of a photovoltaic device can be measured in a short period of time. The characteristics of a photovoltaic device is obtained as an I-V curve by changing a load to photovoltaic device using a load circuit, and by measuring of a change of an electric current and voltage with a variability of the load. In case that a response of photovoltaic device is slow, the flat area length of the second flash is lengthened and the measurement is performed. And in case that the response is quick, the length is shortened and the measurement is performed.

It is also available that a flash from the first light source penetrates a first optical filter and an another flash from the second light source penetrates through a second optical filter, so as to limit the flash of the first light source and second light source as a stable intensity wavelength.

The measurement can be performed for only a single load by a flash of the second light source, or can be performed for multiple points by sweeping of a load using a flash of the second light source.

To perform preliminary measurement and obtain approximate characteristics before measurement of photovoltaic device characteristics is efficient for a measurement Other features and advantages of the present invention will be apparent from the following description when taken in conjunction with the accompanying drawings, in which like reference characters designate similar or identical parts throughout the several views thereof.

DETAILED DESCRIPTION OF THE INVENTION

An embodiment of the present invention is described as follows with reference to the accompanying drawings.

In so doing, specific terminology is employed solely for the sake of clarity, and the present disclosure is not to be limited to the specific terminology so selected. It is to be understood that each specific element includes all technical equivalents that operate in a similar manner and achieve a similar result.

Figure 1:
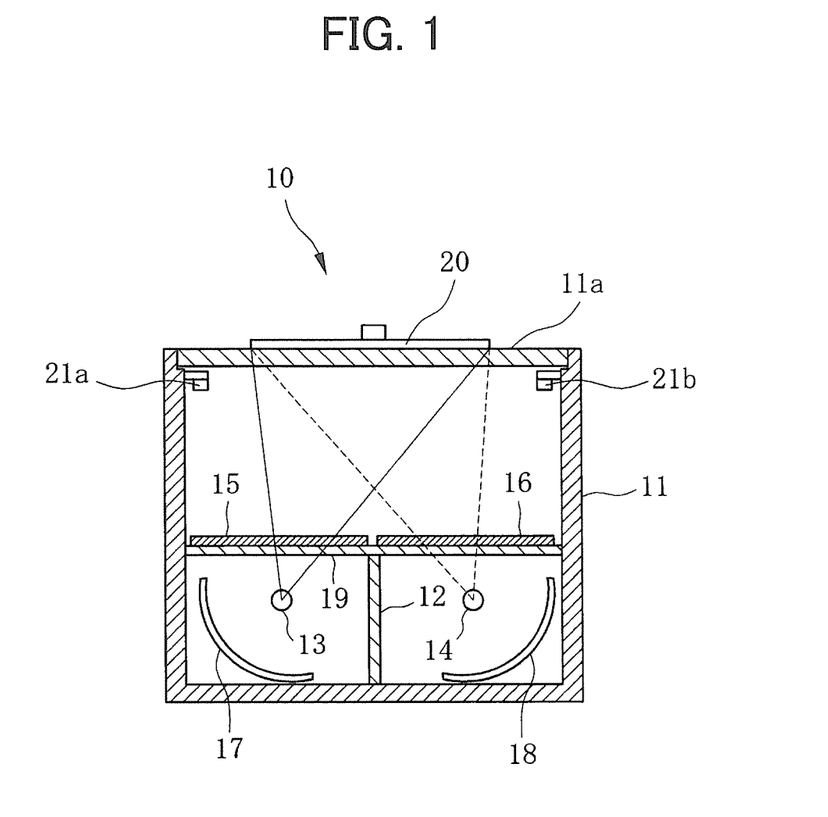
FIG. 1 is a sectional view of a solar simulator configuration of the present invention.

FIG. 1 is a sectional view that shows a configuration of a solar simulator of the present invention. As shown in FIG. 1, a solar simulator 10 of the present invention has a box-like frame 11 and a partition plate 12 that divide the inside this frame into two parts. By the partition plate 12, the frame 11 is divided to two rooms that is optically separated and have an opened upper side. A halogen lamp 13 as a first light source is disposed in one room, and a xenon lamp 14 as a second light source is disposed in another room.

The halogen lamp 13 is a light bulb in which inert gas as nitrogen or argon and minute amounts of halides as iodide, bromide, chloride or fluoride are enclosed.

A xenon lamp 14 is a lamp having a discharge tube in which a xenon gas is enclosed. The xenon gas emits instantaneously by electrifying a condensed electricity of a capacitor rapidly to the lamp winding with trigger signal, so as to obtain a flash.

Reflector 17 and 18 are to irradiate reflected light of the halogen lamp 13 and the xenon lamp 14 uniformly to an measurement object.

A transparent acrylic board 19 is disposed horizontally onto the partition plate 12, and a first optical filter 15 and a second optical filter 16 are disposed on the acrylic board 19. The transparent acrylic board 11a is disposed onto the upper side of the frame 11. A photovoltaic device as the measurement object is disposed onto the acrylic board 11a, and the measurement is performed.

Irradiance detectors 21a and 21b are disposed onto the frame 11a, and the irradiance detector 21a measures an irradiance of the halogen lamp 13, and the irradiance detector 21b measures an irradiance of the xenon lamp 14. In addition, the irradiance detector 21a cannot accept the light from the xenon lamp 14, and the irradiance detector 21b cannot accept the light from the halogen lamp 13.

Since an emission of a halogen lamp is stable, the following configuration is employed. Only one irradiance detector is disposed onto the center of the upper side of the frame 11. The irradiance of the halogen lamp is controlled only while the halogen lamp is turning on. The irradiance of the xenon lamp is controlled while the xenon lamp is turning on.

In addition, the following configuration may be employed. Three irradiance detectors are provided with the solar simulator. First one is used for controlling the irradiance of the halogen lamp. Second one is used for controlling the irradiance of the xenon lamp. Third one is used for both lamps.

The flash, which is emitted from the halogen lamp 13 according to aforementioned embodiments, penetrates the first optical filter 15. By the first optical filter 15, short wavelength parts of the light from the halogen lamp 13 are cut off, and long-wavelength-zone lights are penetrated.

The irradiance of the flash of the halogen lamp 13 which penetrates the first optical filter 15 is detected by the irradiance detector 21a which is disposed at the place to make possible to accept the light from the halogen lamp 13, as shown in FIG. 1.

The irradiance of the flash of the xenon lamp 14 which penetrates the second optical filter 16 is detected by the irradiance detector 21b.

In the solar simulator 10 of the present invention, the photovoltaic device 20 as the measurement object is disposed on the place at which the photovoltaic device can accept the light of the halogen lamp 13 penetrated through the first optical filter 15, and the light of the xenon lamp 14 penetrated through the second optical filter 16.

Figure 2:
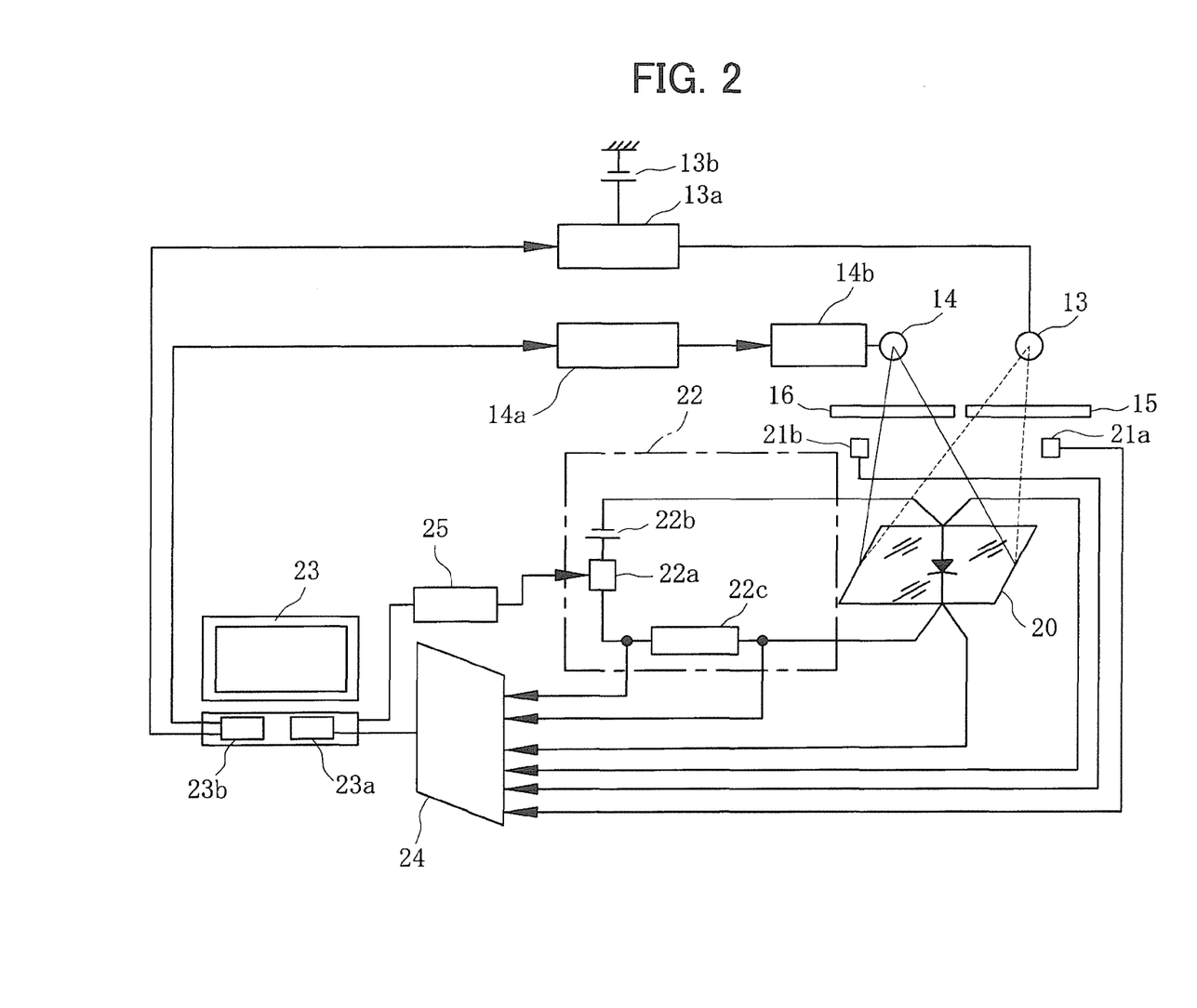
FIG. 2 is a block diagram of a solar simulator of the present invention.

FIG. 2 is a block diagram of the solar simulator 10 of the present invention. The solar simulator of the present invention make an electric current and voltage which is generated from the photovoltaic device 20 to be variable. Thus, an electric load 22a of a load circuit 22 is connected to an output terminal of the photovoltaic device 20. In the load circuit 22 that has the electric load 22a, 22b is a DC power source and 22c is a shunt resistance. It is available to replace the electric load 22a and the DC power source 22b by a bipolar power supply.

An electric current and voltage generated by the photovoltaic device 20 and an irradiance data detected by the irradiance detector 21a and 21b is collected by a data collecting system of the solar simulator 10 of the present invention. In the data collecting system, as shown in FIG. 2, a personal computer 23 that have a data processing board 23a and analogue output board 23b is used. A data collecting board 24 converts an analogue output signal received by several parts to a processible signal in the data processing board 23a. In addition, 25 are an electric load command circuit that is connected to provide the data from the personal computer 23 to the electric load 22a.

The personal computer 23 as a controlling device controls a lighting timing of the halogen lamp 13 and the xenon lamp 14, and a lighting pulse length of each lights by a preprogrammed content.

The personal computer 23 is a wave control device of the halogen lamp 13 and the total control device of the solar simulator 10. The irradiance detector 21a detects the irradiance of the flash that penetrates the first optical filter 15 from the halogen lamp 13, and inputs the irradiance signal to the personal computer 23 via the data collecting board 24. The personal computer 23 stores the data about the relation between a voltage and an irradiance that is necessary to control the halogen lamp 13. To make the top of the pulse wave of the halogen lamp 13 flat on the basis of this data, an output voltage that is generated by the power supply circuit 13a via the analogue output board 23b is controlled in real time to make the irradiance to be constant. A DC power source 13b is connected to the power supply circuit 13a, and the voltage is changed by the power supply circuit 13a and applied to the halogen lamp 13.

The personal computer 23 regulate a timing so that the xenon lamp 14 turns on and can emit a flash while the flash of the halogen lamp 13 keeps a constant irradiance.

Figure 3:
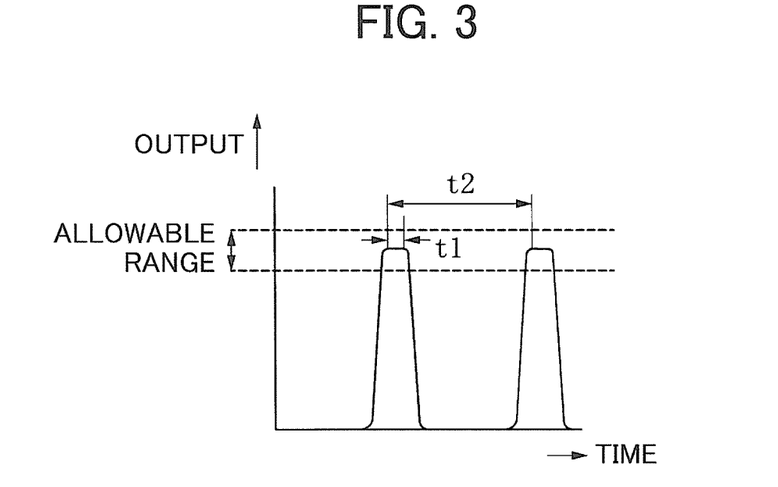
FIG. 3 is a waveform diagram of a flash from a xenon lamp.
Figure 4:
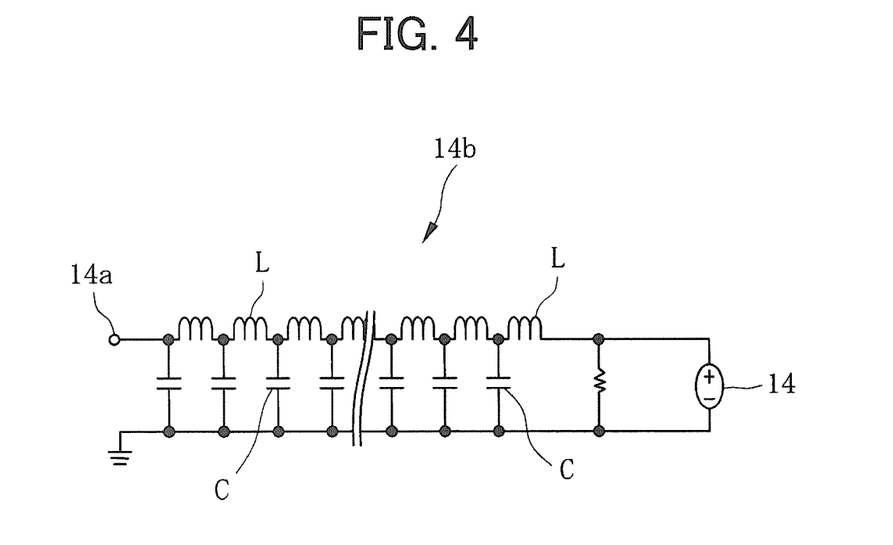
FIG. 4 is an example of a pulse width control circuit that uses multiple coils L and condensers C.

FIG. 3 is waveform diagram of a flash from the xenon lamp 14. A pulse width control circuit 14b (or a pulse width elongation circuit) which uses multiple coil L and condenser C as shown in FIG. 4 is connected to an power supply circuit 14a of the xenon lamp 14, as a wave control device of the xenon lamp 14.

Since the pulse width control circuit 14b is connected to the xenon lamp 14, the top of the pulse wave is made to be flat. A capacity of each condenser C and coil L are decided to make the flatness of the top flat area of the irradiance waveform to form a desirable shape. Thus, it is available to make the xenon lamp 14 emit a flash so that a length t1 of the top flat area in the light pulse shape is controlled to be more than about 1 msec.

Figure 5:
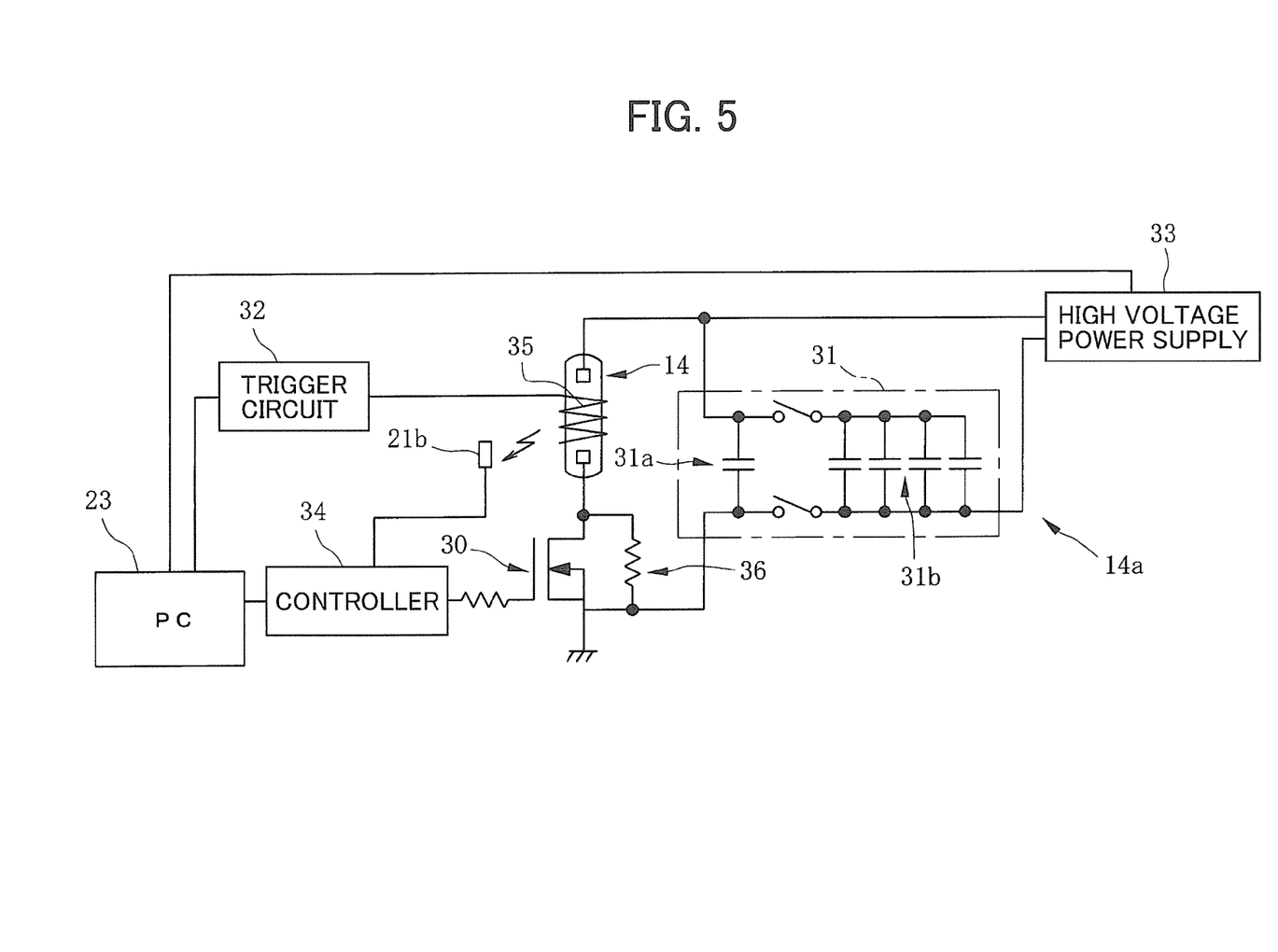
FIG. 5 is a block diagram of a lightning control circuit of a xenon lamp.
Figure 6:
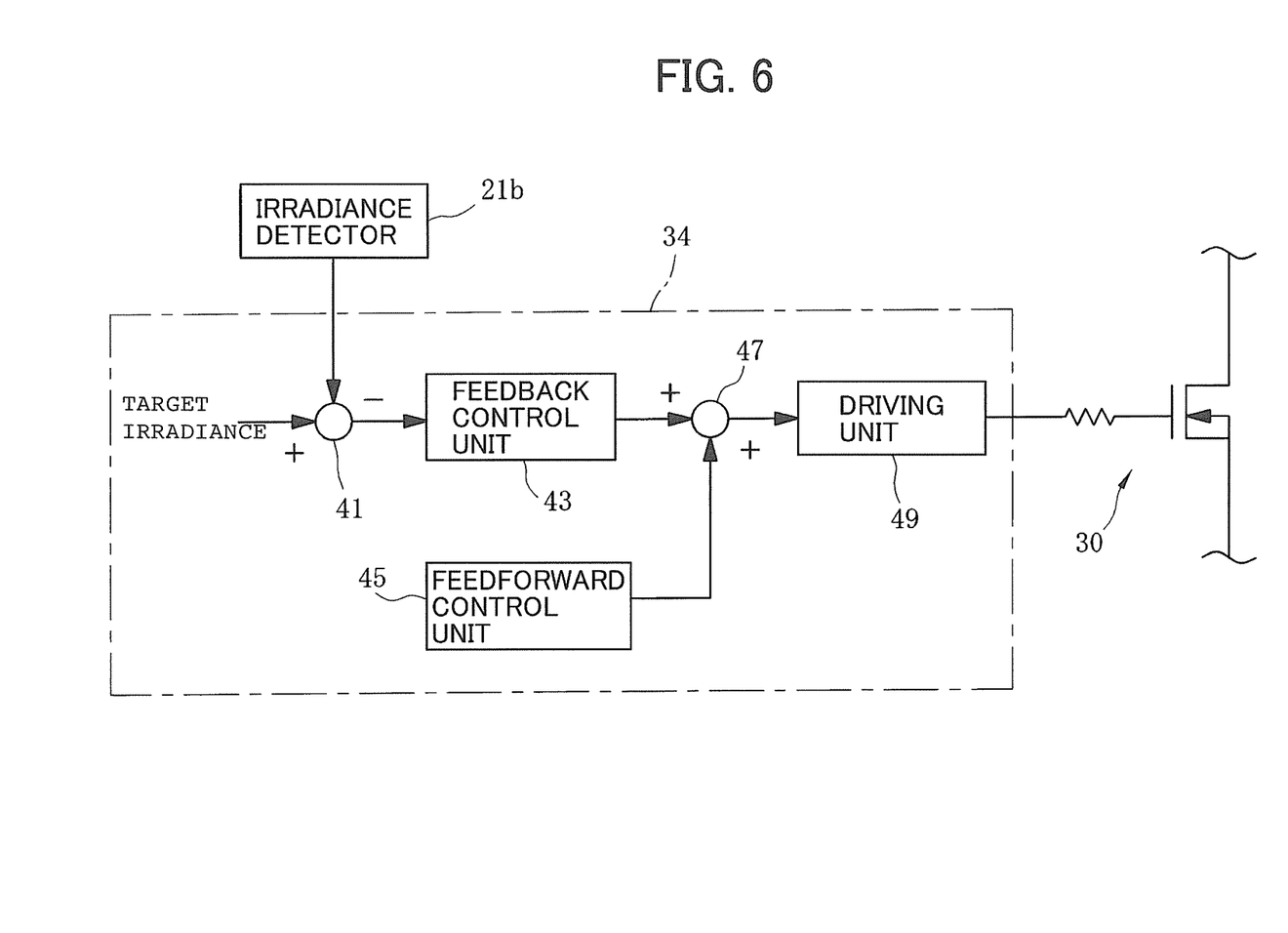
FIG. 6 is a diagram that shows a functional constitution of the controller (or the wave control unit) of FIG. 5.

FIG. 5 and FIG. 6 is a diagram that describes another embodiment to make a pulse wave top area of a flash from the xenon lamp 14 to be flat. FIG. 5 is a block diagram of xenon lamp lighting control circuit, and FIG. 6 is a diagram of function configuration embodiment of the controller (or waveform control device) of FIG. 5.

The configuration of FIG. 5 is that the irradiance detector 21b and the personal computer 23 as controlling device are added to the xenon lamp 14, the electric circuit 14a, and the pulse width control circuit 14b in FIG. 2. As shown in FIG. 5, the irradiance detector 21b, a power-switching element 30, high-voltage supply 33, a capacitor 31, and a controller 34 is connected to the xenon lamp 14.

The trigger circuit 32 is connected to the xenon lamp 14, and the winding 35 of the xenon lamp 14 is connected to the trigger circuit 32. One electrode of the xenon lamp 14 is connected to one electrode of the high-voltage power supply 33, and another electrode of the xenon lamp 14 is connected to another electrode of the high-voltage power supply 33 via the power switching element 30. The power switching element 30 is controlled by the controller 34, and the controller 34 is controlled by the personal computer 23.

The trigger circuit 32 contains a transformer, and the trigger circuit 32 outputs a high-voltage trigger signal to the winding 35 that is winded on the xenon lamp 14. The trigger circuit 32 outputs a trigger signal by a control of the personal computer 23.

The irradiance detector 21b measures an irradiance of a flash emitted from the xenon lamp 14, and the irradiance detector outputs the detected signal to the controller 34.

The capacitor 31 contains a condenser 31a, and is condensed by the high-voltage power supply 33. The capacitor 31 applies a voltage to the xenon lamp 14, and emit a current when the xenon lamp 14 discharge. The high-voltage power supply 33 charges the capacitor 31 by the control of the personal computer 23.

The capacitor 31 also contains a condenser 31b that is connected and disconnected to the condenser 31a by a switch, so as to be able to change a condensing capacity. The condenser group 31b are parallel-connected capacitor of plural condensers.

The controller 34 controls an amount of the current which is emitted from the capacitor 31 and flows to the xenon lamp 14, by a switching driving of the power switching element 30 disposed at downstream side (or grounding side) of the xenon lamp 14. The controller 34 can be configured with a digital signal processor (DSP). The specific function of the controller 34 is described in FIG. 6.

The power-switching element 30 is configured with an insulation gate bipolar transistor (IGBT). A power transistor or a power (MOSFET) can be used as the power-switching element 30.

A resistance 36 connected in parallel to the power-switching element 30 is provided to flow a constant amount electric current to the xenon lamp 14 even when the power-switching element 30 is off.

A function of the controller 34 as a waveform control device is described by FIG. 6. The controller 34 functionally has a first addition unit 41, a feedback control unit (or FB control unit) 43, a feedforward control unit (or FF control unit) 45, a second addition unit 47, and a driving unit 49. These functional configuration are attained by the controller 34 reading and performing a stored program from a memory that is not illustrated.

The first addition unit 41 generates an error signal that indicates an error value between a target irradiance of a flash and current irradiance detected by the irradiance detector 21b. The target irradiance of a flash is set by the personal computer 23. In addition, a detected signal from the irradiance detector 21b is converted to a digital signal by an AD converter that is not illustrated, and is inputted to the first addition unit 41.

The FB control unit 43 generates a control signal to control an error value of the irradiance according to the input error signal from the first addition unit 41, and the control signal is output to the second addition unit 47. A sensitivity function of the FB control unit 43 is generated to have a gain value according to the irradiance error value based on a stable point for making the irradiance error value zero. The sensitivity function of the FB control unit 43 is set by the personal computer 23.

In case that the irradiance of the flash from the xenon lamp 14 exceeds a threshold value, the FF control unit 45 outputs a control signal to the second addition unit 47 according to a control pattern stored in a memory which is not illustrated. The control pattern is decided to keep the flash at the target irradiance for a given time, and is stored by the personal computer 23, in a memory that is not illustrated.

The FF control unit 45 handles a case that the irradiance of the flash detected by the irradiance detector 21b exceeds a threshold value as a start of a feedforward control (or an open loop control). However, in a situation that a timing signal which indicates an output of a trigger signal is accepted by the trigger circuit 32 or the personal computer 23, receiving of the timing signal may be handled as a start of the feedforward control.

The second addition unit 47 adds a control signal from the FB control unit 43 and a control signal from the FF control unit 45, and outputs it to the driving unit 49.

The driving unit 49 performs a switching drive of the power-switching element 30 according to the control signal that is input from the second addition unit 47. In particular, the driving unit 49 controls a current value that is flown to the xenon lamp 14 by changing a duty ratio of the pulse wave that is output to the power-switching element 30 by a pulse width modulation (PWM). A control signal that is input from the second addition unit 47 corresponds to the duty ratio of the pulse wave.

After the duty ratio increasing to the maximum value, a discharge of the xenon lamp 14 is accomplished by keeping the duty ratio at the maximum value for a while. By performing feedforward control, the FF control unit 45 can keep stable the pulse wave top area of the flash from the xenon lamp 14 at a target irradiance in a given time. Because the feedback control has quick response, it is easy to keep the flash at a target irradiance The FF control unit 45 moves to an operating state in case that an irradiance which is detected by the irradiance detector 21b exceeds a threshold value (or before the intensity reaches the maximum value). And the FF control unit 45 wait keeping the duty ratio zero until a timing that the irradiance of the flash reaches a threshold value.

The FB control unit 43 performs a feedback control to keep a flash at a target irradiance while the FF control unit 45 increases a duty ratio gradually. By performing the feedback control, an irradiance of a flash can be kept at a target irradiance. The personal computer 23 measures characteristics of an electric current and voltage of the photovoltaic device 20 while the flash is kept at the target irradiance.

A width of light pulse t1 is decided approximately in consideration of a response of a photovoltaic device as the measurement object. Generally, the top flat area of the pulse waveform as shown in FIG. 2 can be shortened as about 1 msec in case that the photovoltaic device has quick response, and it can be lengthened in case that the responsibility is slow. It may be regulated as about 100 msec for example, in case that the response is remarkably slow.

In case that a length of the light pulse t1 is about 1 to 20 msec and the xenon lamp is only used, it is available to make the flashing cycle t2 of the xenon lamp to be about 0.5 to 1.5 sec. By regulating the flashing cycle appropriately, the xenon lamp 14 dose not overheat and a stable irradiance is obtained.

The light source to expand a light pulse width with a flashing of the xenon lamp 14 by using a DC power supply source that can output a high current can be used for a light source for the solar simulator performing the measurement method of the present invention.

Meanwhile, the halogen lamp 13 is difficult to light in a short period of time because of its property, so the lighting is about 0.5 to several seconds. However, as described above, the irradiance detector 21a and the control unit or the personal computer 23 can make the pulse top area to be flat.

Figure 7:
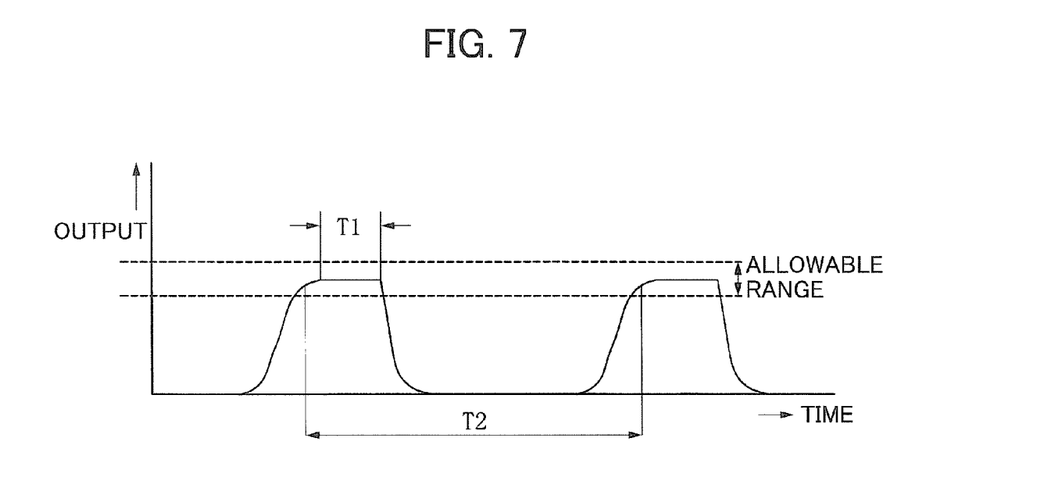
FIG. 7 is an example of a flash pulse from a halogen lamp of which top area is flat.

FIG. 7 is an example of a pulse of a flash of which top area of the halogen lamp 13 is made to be flat. The top flat area length T1 is about 0.5 sec. In case that T1 is about 0.5 sec, the flash interval T2 can be 5 to 10 sec. As a result, the measurement is not affected by a temperature rising of an optical components and the photovoltaic device as the measurement object with the emitting light of the halogen lamp 13.

Next, a measuring method of a multi-junction photovoltaic device by a solar simulator of the present invention is described. First, an irradiance setting of the halogen lamp 13 for the first light source and the xenon lamp 14 for the second light source is performed.

The irradiance setting is performed as follow. The standard photovoltaic device as reference is disposed in the position where the photovoltaic device 20 as the measurement object is disposed, and the irradiance detector 21a and 21b are disposed in a predetermined position. Here, as the standard photovoltaic device, the photovoltaic device made of a top layer and the photovoltaic device made of a bottom layer are used. Each standard photovoltaic device has a proof datum of a short-circuit current Isc at a predetermined irradiance as 1000 W/m² and a proof datum of a maximum electric power Pmax for the halogen lamp 13 and the xenon lamp 14. These proof data are stored in the data processing board 23a.

And general correlative relationships between the irradiance and the output power of a photovoltaic device Isc and Pmax about the halogen lamp 13 and the xenon lamp 14 are installed in a software of the personal computer 23. After aforementioned standard photovoltaic device as reference is measured, a target irradiance at the irradiance detector 21a and 21b is calculated by the correlative relationship formula using a measurement result of the standard photovoltaic device and a proof datum, and the target irradiance will be stored. In the next measurement of the standard photovoltaic device, since the irradiance at the irradiance detector 21a and 21b is controlled to be the target irradiance by a controlling a lamp voltage, the measurement is performed under a condition that the measurement result of the standard photovoltaic device will be a similar datum as the proof datum. A setting of the irradiance has been performed with trial and error conventionally, but by the method of the present invention, it is available that the setting of the irradiance can be performed with remarkably fewer trials.

As an embodiment, the data processing board 23a compares a predetermined irradiance 1000 W/m² with a irradiance which is detected by the irradiance detector 21a and 21b using an operation unit of the personal computer 23. And, an output command for the analogue output board 23b that controls an applied voltage to the light source halogen lamp 13 and the xenon lamp 14 is controlled on the basis of the calculated result by the operation unit. And the irradiance is adjusted to be within the range of ±1% as shown with dot line in FIGS. 3 and 5. The analogue output board 23b has a DC power supply source 22b which controls a charging voltage to the condenser C of the pulse width control circuit 14b of FIG. 4, and a signal output unit which outputs a control signal, which controls a charging voltage to the DC power supply source 22b using aforementioned calculated result of the irradiance. The analogue output board 23b has a signal output unit that controls a voltage which the power supply circuit 13a of the halogen lamp 13 applies to the halogen lamp 13.

After setting an irradiance of the halogen lamp 13 and the xenon lamp 14 is completed, a spectrum distribution of the light that is emitted by two light sources to the photovoltaic device 20 is decided.

Next, in case that a detected irradiance is same or similar as a predetermined value (this range is called "allowable range"), a output measurement of the photovoltaic device 20 is performed.

The standard photovoltaic device is replaced with the photovoltaic device 20 as the measurement object. Then, the flash-lighting of the halogen lamp 13 is performed. And while the top area of the flash from the halogen lamp 13 is flat, the xenon lamp 14 is emitted.

Figure 8:
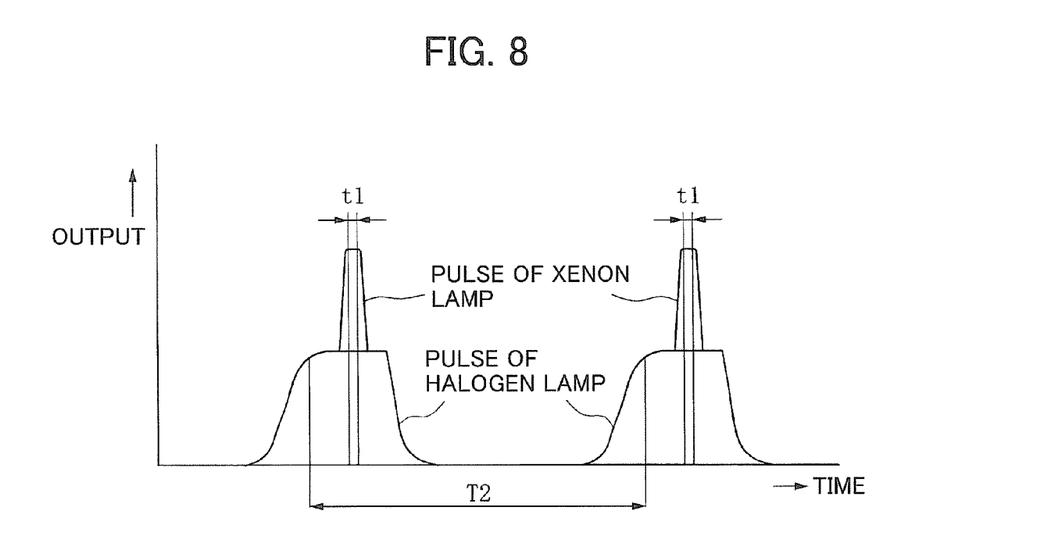
FIG. 8 is a diagram that shows situation of a xenon lamp emitting while a top of a flash of a halogen lamp is flat.

FIG. 8 shows a situation in which the xenon lamp 14 emits while the area of the flash from the halogen lamp 13 is flat. When the flat area of two flash overlap, the measurement of the photovoltaic device is performed.

The measurement is performed as the flash as shown in FIG. 8 emits once. An irradiance is automatically-controlled to be within a predetermined value including the allowable range, wherein a lamp voltage increases and decreases to each flash, in case that the detected irradiance of the irradiance detector 21a and 21b is too high and low and exceeds the allowable range. The allowable range is ±1 to ±5% as a standard. By obtaining previously the changing characteristics of the irradiance by the lamp voltage, the irradiance can be adjusted by the lamp voltage.

In case that the irradiance is similar as the predetermined value, the current which is output from the photovoltaic device 20 increases and decreases by controlling the electric load 22a which is connected to the photovoltaic device 20 by the output from the electric load command circuit 25.

The electric load command circuit 25 sweeps the electric load 22a by increasing and decreasing continuously, or changes stepwise. A data correcting system which is mainly configured with the personal computer 23 and the data correcting board 24, can correct 100 to 200 series of an irradiance data, an output current and a voltage data of photovoltaic device 20 for a I-V curve, during the each flash of the halogen lamp 13 and the xenon lamp 14.

For a preliminary measurement, the halogen lamp 13 as a first light source emits, and next, the xenon lamp 14 emits. Then, the halogen lamp 13 and the xenon lamp 14 emit for an actual measurement. By simultaneous emitting of the halogen lamp 13 and the xenon lamp 14 twice at the preliminary measurement and the actual measurement, output characteristics is measured. A measurement time of the method is about 5 seconds. The emitting time of the halogen lamp 13 is short, so a temperature rising of an optical components is suppressed. Output characteristics is measured more accurately, because the temperature rising is small.

It is desirable to perform the preliminary measurement before the actual measurement in the present invention. In the preliminary measurement, the flash as same as in the actual measurement is used. In the flash emission, approximate values of the short-circuit current Isc and an open circuit voltage Voc of the photovoltaic device 20 as the measurement object are measured by quickening of the sweep speed and changing the electric load 22a over a broad range. By obtaining the approximate values, a sweep range of the electric load 22a can be decided and the sweep speed at the actual measurement can be slowed down. The preliminary flash may be the configuration of plural flashes. By performing the measurement with plural flashes, more accurate approximate value is obtained, and in the next actual measurement, sweeping the load becomes more appropriate for the characteristics of the photovoltaic device as the measurement object.

After the short-circuit current Isc and the open circuit voltage Voc are obtained, a flash emission is performed to make an I-V curve. The electric load is swept with one flash emission and 100 to 200 point data for making I-V curve are obtained. Then, the data collecting will be stopped and the halogen lamp 13 and the xenon lamp 14 will be paused when the light pulse comes near the terminal of the top flat area of the wave. In the meantime, controlling of the lamp voltage will be performed for next one flashing. After the predetermined pausing time have passed, then next one flashing is performed, and comparing of the irradiance is performed as described above, and the output characteristics data is collected, and these processes is repeated. It makes easy to connect I-V curve by overlapping the measurement points of the flash to other measurement point of the next one. In an embodiment of the present invention, it is available to collect data at 400 points by 2 flash emissions and obtain the I-V curve. Thus, total 4 flash emission is enough to accomplish the measurement even if the preliminary measurement uses 2 flash emission.

By the measurement method of the present invention, the measurement results are not affected by an increasing of the lamp temperature by performing a lighting with 5 to 10 seconds interval, in case that the halogen lamp 13 emit 0.5 seconds. Thus, the measurement is performed with 20 to 40 seconds cycle, even if 4 flash emission is performed including the preliminary measurement. Also, it is available to increase the flashing times to several times according to the response of the photovoltaic device as the measurement object and measure.

Figure 9:
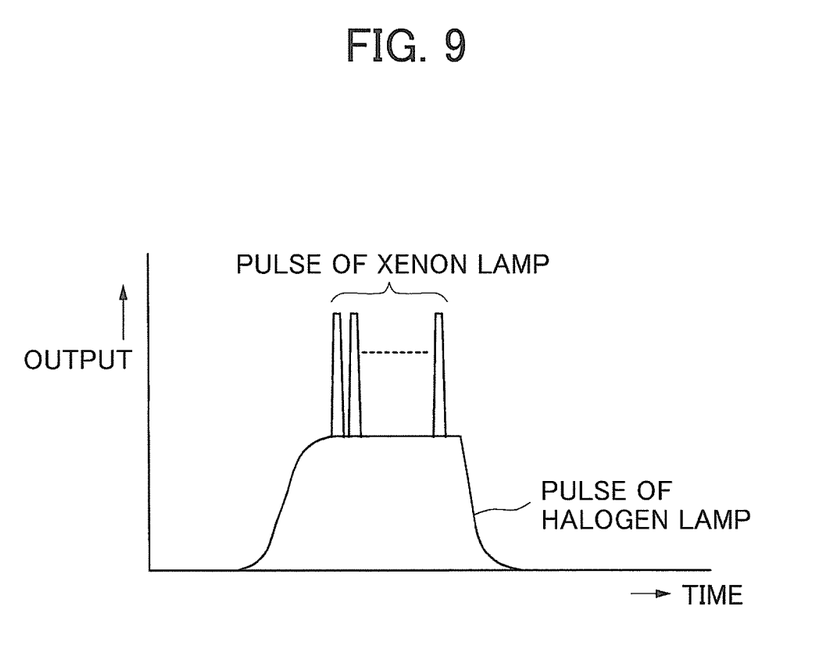
FIG. 9 is a diagram that describes a measurement method using multiple flash lamp emission of a xenon lamp during one flash of a halogen lamp.

FIG. 9 is a diagram that describes a measurement method, wherein the flash of the xenon lamp 14 is performed plural times during one flash of the halogen lamp 13. In this case, the lighting time of the halogen lamp 13 is within the range of 0.5 to several seconds. In case that the halogen lamp 13 lights several seconds, it will take a long time for a next lightning. Also, a temperature of an optical components and the photovoltaic device as the measurement object are easy to rise. Thus, if the method is employed, the halogen lamp 13 preferably lights only one time.

As the process described above, data collecting of necessary points for the output measurement of the photovoltaic device 20 as the measurement object is performed, and the I-V curve is made with the collected data. In the present invention, a confirmation of the irradiance, an emitting frequency for controlling, an emitting frequency for detecting of the short-circuit current, and an emitting frequency for the measurement of the I-V data are not limited to the aforementioned embodiments.

In an embodiment, it is also available to use a voltage controlling method for controlling of the electric load 22a in addition to the current controlling method. In a data collecting process, it is also available to record an irradiance signal successively at an elapsed time, and record a current and a voltage signal of the photovoltaic device 20 at the time. On the basis of a calculated result of the recorded data, an output response delay of a measurement object to the irradiance can be calculated. On the basis of the output response delay, it is available to calculate a sweep speed and a flashing frequency, so as to perform a measurement that is appropriate for the response delay.

In the aforementioned embodiment. Plural data is obtained with sweeping of the electric load 22a by one flash emission, but not limited to this. For example, it is available not to sweep the electric load during one flash, but to obtain one data by one flash emission. To measure a photovoltaic device whose response is very slow, a controlling condition of the electric load 22a is kept to be a constant condition during a flashing, and the data will be collected at a last half of the light pulse in which the output from the photovoltaic device as the measurement object is saturated. Lengths of the top flat area of the light pulse wave is lengthening according to a responsibility of the photovoltaic device. For example, a flat area time that is 4 msec in a standard condition is lengthening to 8 to 10 msec. On the contrary, for a measurement of a photovoltaic device of which response is quick, a flat area time may be changed to 1 msec.

Because a standard short pulse flash doesn't have a flat area in pulse wave, a slow response photovoltaic device cannot be measured. However, according to the present invention, because the pulse wave has a flat area, a slow response photovoltaic device can be measured accurately.

On the contrary, by lengthening a flat area time of one flash to be for example 10 msec, more than 400 points data can be obtained with one flash.

As many apparently widely different embodiments of the present invention can be made without departing from the spirit and scope thereof, it is to be understood that the invention is not limited to the specific embodiments thereof except as defined in the appended claims.

What is claimed is:

1. A solar simulator comprising:
a first light source;
a second light source of which wavelength band is different from the wavelength band of the first light source;
a first irradiance detector which measures an intensity of a first flash from the first light source;
a first waveform control device which controls so as to make a top of a first light pulse shape of the first light source to be flat by measurement of the first irradiance detector;
a second irradiance detector which measures an intensity of a second flash from the second light source;
a second waveform control device which controls so as to make a top of a second light pulse shape of the second light source to be flat by measurement of the second irradiance detector;
a load circuit which applies a load to a photovoltaic device as a measurement object; and
a total control device which controls the first light source, the second light source, the first waveform control device, the second waveform control device and the load circuit;
wherein the total control device once or plural times makes the second light source emit the second flash of which the second light pulse shape is flat and is shorter pulse than the first flash of the first light source while the top of the first light pulse shape of the first light source is flat.

2. The solar simulator according to claim 1, wherein the total control device performs so as to emit a combined light of the first light source and the second light source plural times.

3. The solar simulator according to claim 1, further comprising:
a first optical filter which a predetermined wavelength light of the first flash from the first light source penetrates so as to be irradiated to a photovoltaic device as a measurement object; and
a second optical filter which a predetermined wavelength light of the second flash from the second light source penetrates so as to be irradiated the light to a photovoltaic device as a measurement object.

4. The solar simulator according to claim 1, wherein the total control device sweeps the load of the photovoltaic device by the load circuit.

5. The solar simulator according to claim 1, wherein the second waveform control device has a FF control unit, which performs feedforward control to make the top of the second light pulse shape of the second light source to be flat.

6. The solar simulator according to claim 5, wherein the second waveform control device has FB control unit which performs feed back control.

7. A measurement method of a multi-junction photovoltaic device comprising:

a process that a first light source emits a first flash and an irradiance detector measures an intensity of the first flash and a top of a first light pulse shape of the first light source is controlled so as to be flat;
a process that a second light source with different wavelength band from the first light source once or plural times emits a second flash which has a flat top and is shorter pulse than a flat area of the first flash from the first light source, while the top of the first light pulse shape of the first light source is flat; and
a process that the first flash from the first light source and the second flash from the second light source are irradiated to a photovoltaic device as a measurement object, and during the emission of the second flash from the second light source, the load of the photovoltaic device is controlled, and a current and a voltage generating from the photovoltaic device are measured at a single point or more points.

8. The measurement method of the multi-junction photovoltaic device according to claim 7, wherein the first light source emits the first flash plural times while the second light source only emits the second flash one time.

9. The measurement method of the multi-junction photovoltaic device according to claim 7, further comprising:
a process that the predetermined wavelength light of the first flash from the first light source penetrate a first optical filter; and
a process that the predetermined wavelength light of the second flash from the second light source penetrate a second optical filter.

10. The measurement method of the multi-junction photovoltaic device according to claim 7, wherein the process to measure a current and voltage generating from the photovoltaic device at a single point or plural points by controlling the load of the photovoltaic device is the process to measure the current and the voltage generating from the photovoltaic device at plural points by sweeping the load of the photovoltaic device.

11. The measurement method of the multi-junction photovoltaic device according to claim 7, further comprising:
a preliminary measurement process that the first light source irradiates the first flash to the photovoltaic device and the second light source irradiates the second flash to the photovoltaic device before the measurement process, and the approximate value of characteristic value of the photovoltaic device is obtained by controlling the load.

12. The measurement method of the multi-junction photovoltaic device according to claim 7, wherein the first light source emits the first flash once, and the second light source plural times emits the second flash which has the flat top and is shorter pulse than the flat area of the first flash from the first light source while the top of the first light pulse shape of the first light source is flat.

13. The measurement method of the multi-junction photovoltaic device according to claim 12, wherein performing feedforward control to make a top of a second light pulse shape of the second light source to be flat.

14. The measurement method of the multi-junction photovoltaic device according to claim 13, wherein performing feedback control furthermore to make the top of the second light pulse shape of the second light source to be flat.

* * * * *